United States Patent
Jaspers

(10) Patent No.: US 6,819,326 B2
(45) Date of Patent: Nov. 16, 2004

(54) MEMORY ADDRESS TRANSLATION FOR IMAGE PROCESSING

(75) Inventor: Egbert Gerarda Theodorus Jaspers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/043,536

(22) Filed: Jan. 11, 2002

(65) Prior Publication Data

US 2002/0135589 A1 Sep. 26, 2002

(30) Foreign Application Priority Data

Jan. 12, 2001 (EP) ............................................. 01200088
Jan. 19, 2001 (EP) ............................................. 01200206

(51) Int. Cl.$^7$ ............................................. G06F 12/10
(52) U.S. Cl. ..................... 345/568; 345/520; 345/531; 345/572; 711/202
(58) Field of Search ................................ 345/501–506, 345/519–520, 522, 530–574, 564–572; 700/200, 202, 203–206, 100

(56) References Cited

U.S. PATENT DOCUMENTS

| | | | | |
|---|---|---|---|---|
| 5,706,034 A | * | 1/1998 | Katsura et al. ............. | 345/539 |
| 6,128,717 A | * | 10/2000 | Harrison et al. ............ | 711/202 |
| 6,269,174 B1 | * | 7/2001 | Koba et al. ................. | 382/107 |
| 6,356,988 B1 | * | 3/2002 | Takizawa ..................... | 711/202 |
| 6,480,539 B1 | * | 11/2002 | Ramaswamy .......... | 375/240.03 |
| 6,629,187 B1 | * | 9/2003 | Krueger et al. ................ | 711/3 |
| 2001/0013045 A1 | * | 8/2001 | Loschky et al. ............ | 707/530 |

OTHER PUBLICATIONS

"Array address Translation for SDRAM–Based Video Processing Applications", by H. Kim eta l., Dept. of EECS, Korea Advanced Institute of Science & Technology, pp. 922–931.

* cited by examiner

Primary Examiner—Kee M. Tung
(74) Attorney, Agent, or Firm—Michael J. Ure

(57) ABSTRACT

A memory device (118) may use a burst access mode to access a number of consecutive data words by giving one read or write command. These data bursts represent non-overlapping data-units in the memory device which can only be accessed as a whole. Because a request for data may contain only a few bytes and can overlay more than one data-unit in the memory device, the amount of transfer overhead is significant. To minimize this overhead a good mapping from logical addresses to physical addresses is important. For the address translation, a logical array is partitioned into a set of rectangles called windows and each window is stored in a row of the memory device. Data request of data-blocks that are actually stored or retrieved, are analyzed during a predetermined period, to calculate the optimal window size. The memory address translation unit (102) performs the analysis and generates the mapping.

4 Claims, 5 Drawing Sheets

MEMORY ADDRESS TRANSLATION FOR IMAGE PROCESSING

Figure 1:
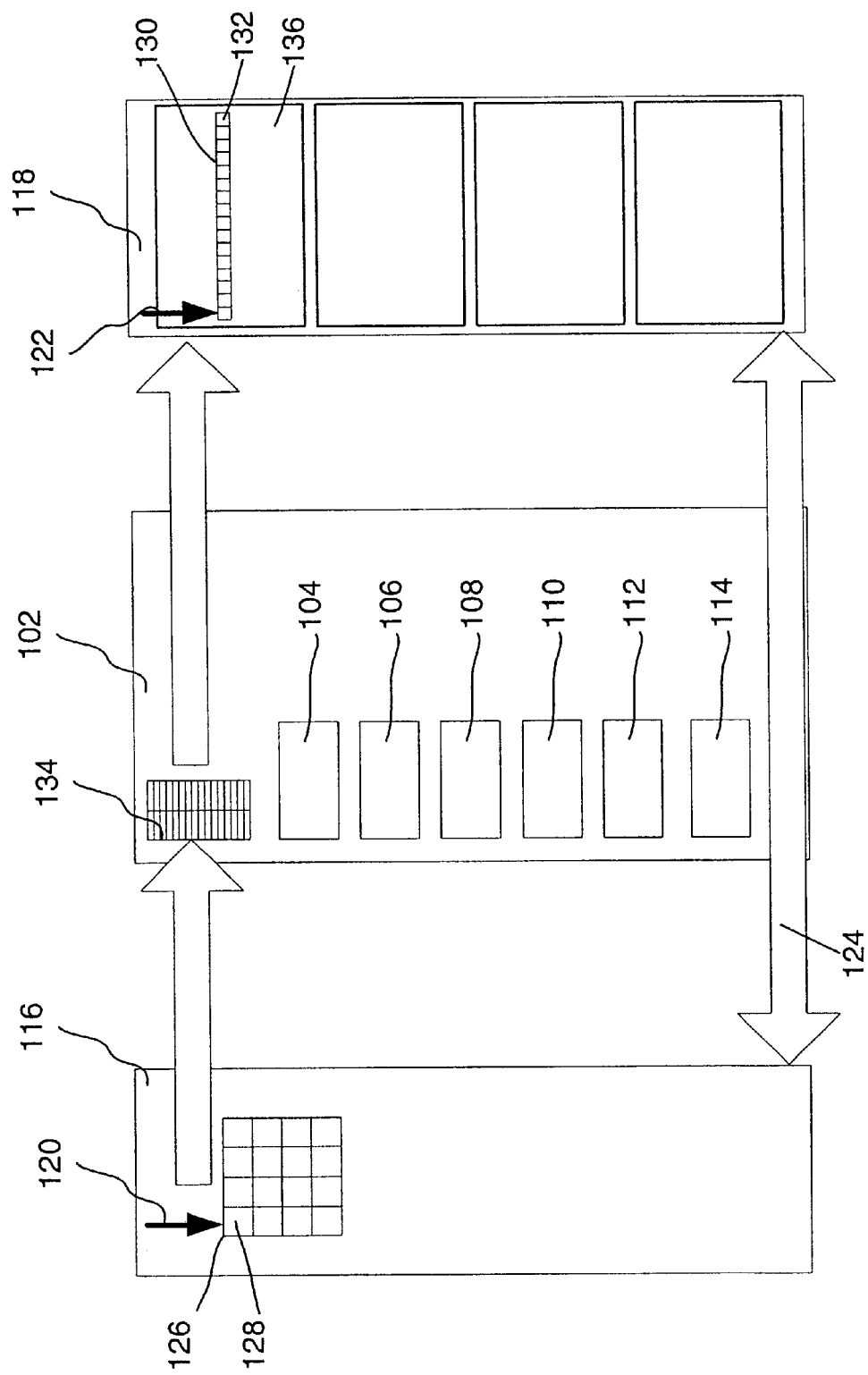

The invention relates to a memory address translation unit designed to generate a mapping to translate a logical address of a data element of a data-block, to a physical address of a data cell of a data-unit, being part of a memory device, comprising an analyzer for analyzing properties of the memory device and properties of data-blocks, and a mapping generator for generating the mapping based on output of the analyzer.

The invention further relates to an image processing apparatus comprising such a memory address translation unit.

The invention further relates to a method to generate a mapping to translate a logical address of a data element of a data-block, to a physical address of a data cell of a data-unit, being part of a memory device, comprising a first step to analyze properties of the memory device and properties of data-blocks, and a second step to generate the mapping based on results of the first step.

One type of prior art memory address translation unit is disclosed in the article Array Address Translation for SDRAM-based Video Processing Application, in Visual Communications and Image Processing 2000, Proceedings of SPIE- The International Society for Optical Engineering, Vol. 4067, part two, Year 2000, pages 922.931.

As the resolution of video processing applications becomes high, video signal processors have to deal with a large amount of data within a tightly bounded time. To obtain high memory bandwidth, some memory devices, e.g. SDRAM, use an important feature: the burst access mode. The burst access mode makes it possible to access a number of consecutive data words by giving one read or write command. Because the reading of dynamic memory cells is destructive, the content in a row of cells in the memory bank is copied into a row of static memory cells, the page registers. Subsequently, access to this row is provided. Similarly, when another row has to be accessed, first the content in the row of static memory cells has to be copied back into the original, destructed, dynamic cells. These actions, referred to as row-activations and respectively pre-charges, consume valuable time in which the array of memory cells, i.e. a bank, cannot be accessed. To optimize the utilization of the memory-bus bandwidth, data should only be accessed at the grain size of a data burst, e.g. eight words. These data bursts represent non-overlapping data-units in the memory device which can only be accessed as a whole. Because a request for data may concern only a few bytes, i.e. the data-units are larger than the requested data blocks and a request for data can involve more than one data-unit in the memory device, the amount of transfer overhead may be significant. To minimize this overhead a good mapping from logical addresses to physical addresses is important. To illustrate this the following example is provided. A video processing algorithm processes two-dimensional arrays of 8×8 pixels. Such two-dimensional arrays are represented as data-blocks. If the addresses of the various pixels are linearly mapped to physical addresses, accessing such a data-block causes seven row-changes. However if the pixels of such 8×8 data-block are kept in one data-unit of the memory device, accessing such a 8×8 data-block does not induce any row-changes.

From the article Array Address Translation for SDRAM-based Video Processing Application, in Visual Communications and Image Processing 2000, Proceedings of SPE- The International Society for Optical Engineering, Vol. 4067, part two, Year 2000, pages 922–931, is known a memory address translation unit for reducing the number of memory cycles in multi-dimensional video processing applications. In this article an algorithm is described that searches for a suitable window size considering the memory access patterns and memory parameters. A logical array, e.g. a video frame, is partitioned into a set of rectangles called windows. The window size determines how pixels from e.g. a video frame are divided into a number of groups of related pixels. In other words, a video frame is split in a number of regions, wherein the spatial dimensions of such a region correspond to the dimensions of a window. All pixels from such a region belong to one group of related pixels. Each group of related pixels is stored in a row of the memory device. The length of a window corresponds with the number of pixels in horizontal direction. The height of a window corresponds with the number of pixels in vertical direction. Address translation means determination of a physical address for a logical address. To store a data element into a memory device, a physical address of a data-cell, being a part of a data-unit, has to be calculated for the logical address of the data element. Each pixel has a logical address. This address might be the set of co-ordinates of the pixel within the video frame. If it is required that a group of related pixels has to be stored in one data-unit, then this determines the calculation of the physical addresses related to the pixels to be stored. The pixels from a group of related pixels should be mapped to consecutive physical addresses. In the article a mapping of video data into memory is proposed related to analyzing the application software.

The consequences of estimating the window size by analyzing the application software only, is that the estimated window size is not optimal. This results in a mapping of logical to physical addresses that is not optimal. The effect is that a group of related pixels is not stored in one data-unit but spread over several data-units. One data-block request, to access such a group of related pixels has a significant memory transfer overhead. The memory device is invoked several times, instead of performing one burst access.

Besides the consequence of estimating the window size by analyzing the application software only, without considering data dependencies, it is not always possible to analyze the application software, because the code might not be available. That may be an issue if the code, or parts of it, has been developed by a third party.

It is a first object of the invention to provide a memory address translation unit of the kind described in the opening paragraph with an improved mapping to translate a logical address of a data element of a data-block to a physical address of a data cell of a data-unit.

It is a second object of the invention to provide an image processing apparatus comprising such a memory address translation unit.

It is a third object of the invention to provide a method of the kind described in the opening paragraph with improved mapping to translate a logical address of a data element of a data-block to a physical address of a data cell of a data-unit.

The first object of the invention is achieved in that the analyzer analyzes values of properties of actual data-blocks that are actually stored to or retrieved from the memory device during a predetermined period of time. Values of properties of data-blocks that are actually stored or retrieved runtime, can differ from values of properties of data-blocks from which it is assumed, based on analysis of the application software only, that they will be stored or retrieved. Furthermore the probability of occurrence of the data-blocks is impossible to derive by analyzing the application software, without considering data dependencies. Most application programs contain a number of loops and conditional tests. The consequence of these conditional tests is that the program has a number of parallel paths. The input data of the program determines which paths are actually taken. In other words the input data to be processed by an application program strongly influences the internal variables of the program and thus the memory accesses. This happens for example in an MPEG decoder. It strongly depends on the strategy taken by the encoder what type of data-blocks the MPEG decoder will have as its operands.

An embodiment of the memory address translation unit according to the invention is described in claim 2. An important property of the data-blocks is the probability distribution of the physical address of each first data cell corresponding to the first data element of each data-block that is actually stored to or retrieved from the memory device. Based on such address, the size of a data-unit and the size of the particular data-block it can be determined how many data-units contain data elements from that data-block. If the number of data elements of one data-block fit in one data-unit it is favorable that they are placed in one data-unit. Spread of data elements over data-units must be as minimal as possible. Because if a request for data overlays more than one data-unit in the memory device, then each of the data-units must be accessed resulting in a significant memory transfer overhead.

An embodiment of the memory address translation unit according to the invention is described in claim 3. Another important property of the data-blocks is the probability of occurrence. A program can have several types of operands corresponding to types of data-blocks. For example in the case of MPEG the set of data-blocks is V=(16×16), (17×16), (16×17), (17×17), (16×8), (18×8), (16×9), (18×9) (16×4), (18×4), (16×5), (18×5). However these types are not all used with the same frequency. The probability of occurrence and thus request for memory access differs per type. For MPEG applications, the reference pictures are written in memory by means of MacroBlocks. Although the amount of write requests is equal, the probability of occurrence is relative to the total amount of request. Hence, the occurrence probability of the write requests highly depends on the amount of data requests for the prediction. The latter, is determined by amongst others, the amount of field and frame predictions, the structure of the Group Of Pictures (GOP), the amount of forward, backward and bi-directional predicted MacroBlocks in a B-picture, etc. It is advantageous if the mapping depends on the probability of occurrence. If the probability of occurrence of a specific type of data-block is relatively high, then it must have a relatively high influence on the window size.

An embodiment of the memory address translation unit according to the invention is described in claim 4. Based on the information gathered by inspecting all memory accesses during a predetermined period of time, the memory translation unit is arranged to analyze whether the current mapping, as used during the predetermined period of time, resulted in the lowest possible memory transfer overhead for the data-blocks stored in respectively retrieved from the memory device. Besides information about the data-blocks which is achieved by inspecting all memory accesses during a predetermined period of time, values of properties of the memory device must be known, e.g. the width of the memory bus and the number of banks. These properties are constants and must be provided to the memory address translation unit. With a cost function of the memory transfer overhead the optimal dimensions of the windows can be calculated mathematically. The mapping is primarily based on the dimensions of the windows.

An embodiment of the memory address translation unit according to the invention is described in claim 5. The memory address translation unit is arranged to create a new mapping when it is externally triggered to do so. The advantage is that the external trigger can be invoked at any time.

An embodiment of the memory address translation unit according to the invention is described in claim 6. The memory address translation unit is arranged to create a number of mappings. For each of these mappings the memory address translation unit is able to calculate the memory transfer overhead One of these mappings is the one that is actually in use, i.e. the active mapping. If the memory address translation unit detects that the active mapping did not result in the lowest possible memory transfer overhead, then the mapping with the lowest possible memory transfer overhead can be made the active mapping. The result of this strategy is that at any time the chance that the active mapping is equal to the mapping with the lowest possible memory transfer overhead is relatively high.

An embodiment of the memory address translation unit according to the invention is described in claim 7. The memory address translation unit is beneficial in all cases that use is made of a memory device having the feature of burst access mode. The burst access mode makes it possible to access a number of consecutive data words by giving one read or write command. An example of such memory device is a synchronous dynamic random access memory (SDRAM) device. Also for accessing more sophisticated memory devices like double data rate synchronous DRAM (DDR SDRAM) or Direct Rambus DRAM the memory address translation unit is beneficial.

An embodiment of the memory address translation unit according to the invention is described in claim 8. Most video processing algorithms are based on multi-dimensional arrays, i.e. data-blocks and nested loops. Usage of the memory address translation unit can be very beneficial for video or still-image processing algorithms. In that case an element of a data-block is related to the luminance value of a pixel. The luminance value of a pixel may represent the value of the combination of color components, Red Green and Blue, or the value of one of the color components.

An embodiment of the memory address translation unit according to the invention is described in claim 9. Besides the feature of the burst access mode, memory devices can have a multiple bank architecture. To hide the memory cycles needed for row-activations and pre-charges, a multiple bank architecture is used, where each bank is accessed alternatively. A bank is accessed independently from the other banks. The organization into memory banks, i.e. a strategy to spread the data-blocks over the various banks, is an important element for memory bandwidth efficiency. This strategy must be provided to the memory address translation unit. Knowledge of the meaning of the data-blocks is important. For several applications in a multi-media system, it is necessary to read the video data both progressively and interlaced, e.g. frame prediction and field prediction for MPEG decoding. However, when subsequent odd and even lines are mapped onto the same data-unit, it is not possible to access only odd or even lines without wasting memory bandwidth. Therefore, the odd and even lines are positioned in different banks of the memory device. As a result, the data-units are interleaved in the memory device when the vertical size of the data-blocks is larger than 1. This knowledge must be taken into account in order to determine the optimal mapping. To achieve this, the set of data-blocks used to determine the optimal mapping must consist of data-blocks belonging to data request of:

both progressive and interlaced video, or interlaced video only, or progressive video only This means that the set of data-blocks comprises:

data-blocks for which a data element of a data-block is related to the luminance value of a pixel belonging to an even line of a video frame;

data-blocks for which a data element of a data-block is related to the luminance value of a pixel belonging to an odd line of a video frame; and data-blocks for which a data element of a data-block is related to the luminance value of a pixel belonging to an even line or an odd line of a video frame.

An embodiment of the memory address translation unit according to the invention is described in claim 10. In many cases data-blocks will be requested, wherein all rows of the data-block have equal numbers of data elements. In that case all data elements of the rectangular data-block are accessed. It might be that retrieval of all data elements of this rectangular data-block is not required, e.g. because some of these data elements have been accessed already. The memory address translation unit is able to generate a mapping by analyzing data-blocks of both types.

The third object of the invention is achieved in that the method comprises a first step to analyze values of properties of the data-blocks that are actually stored to or retrieved from the memory device during a predetermined period of time and a second step to generate the mapping.

Figure 2A:
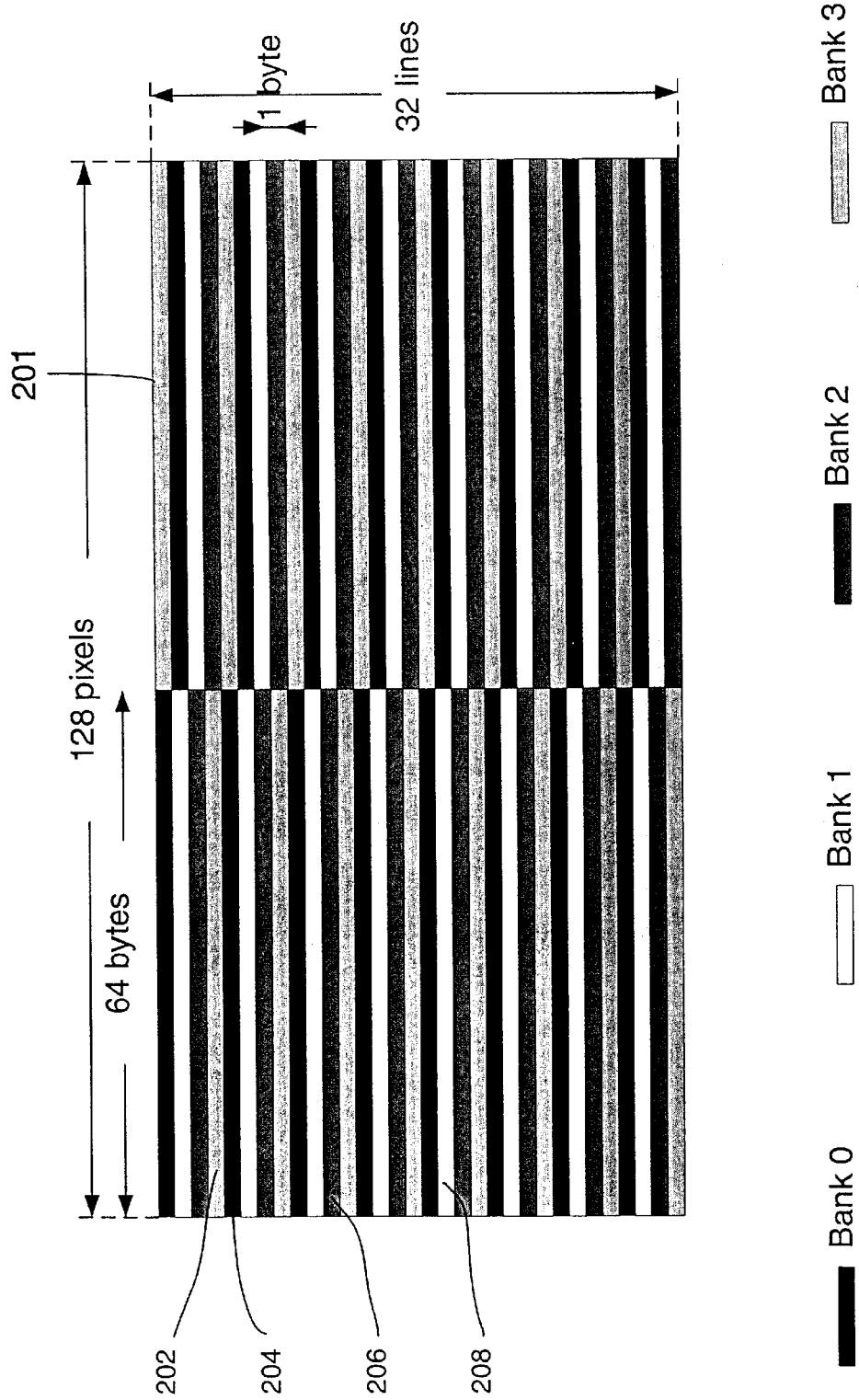
Figure 2B:
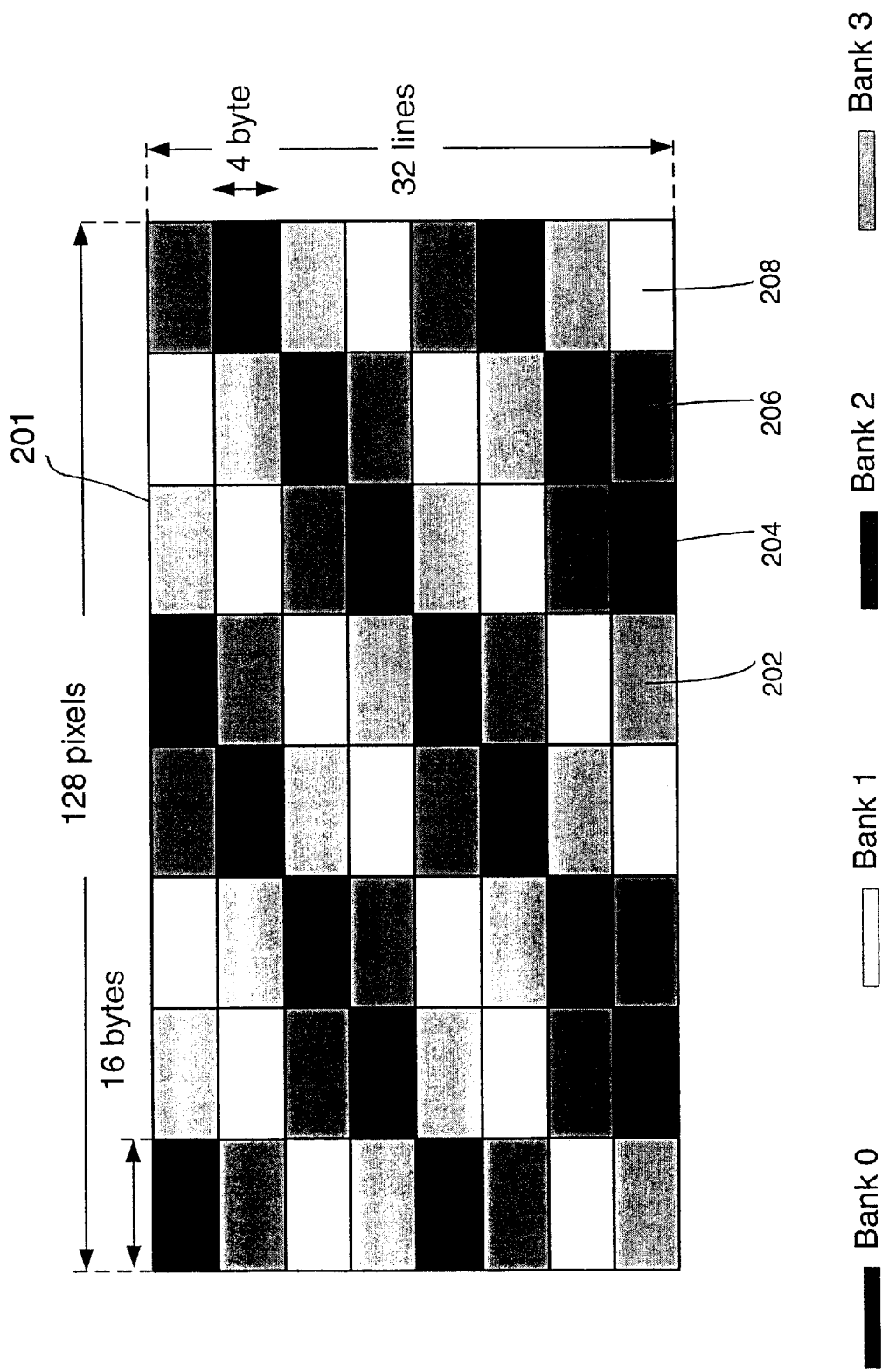
Figure 3:
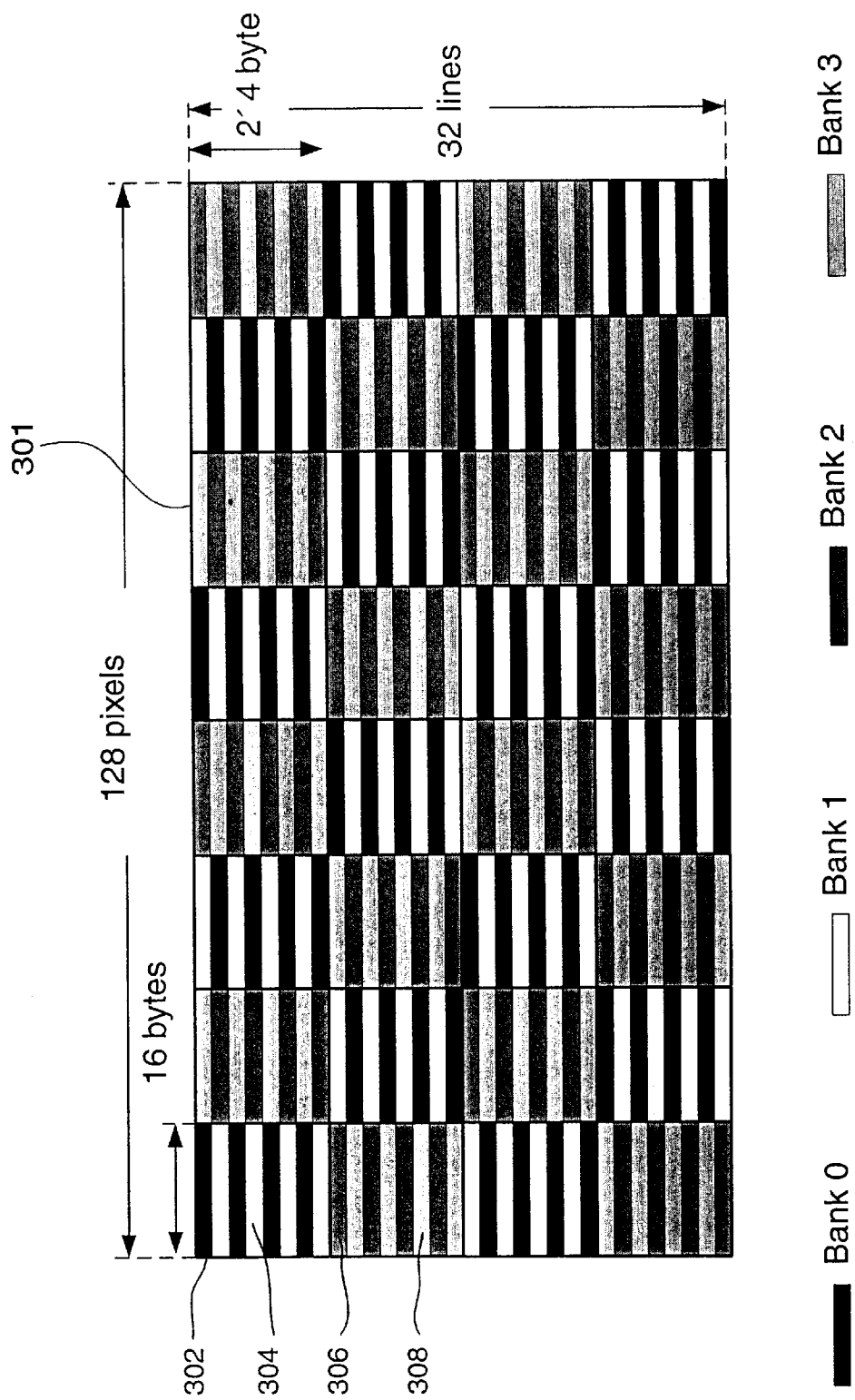
Figure 4:
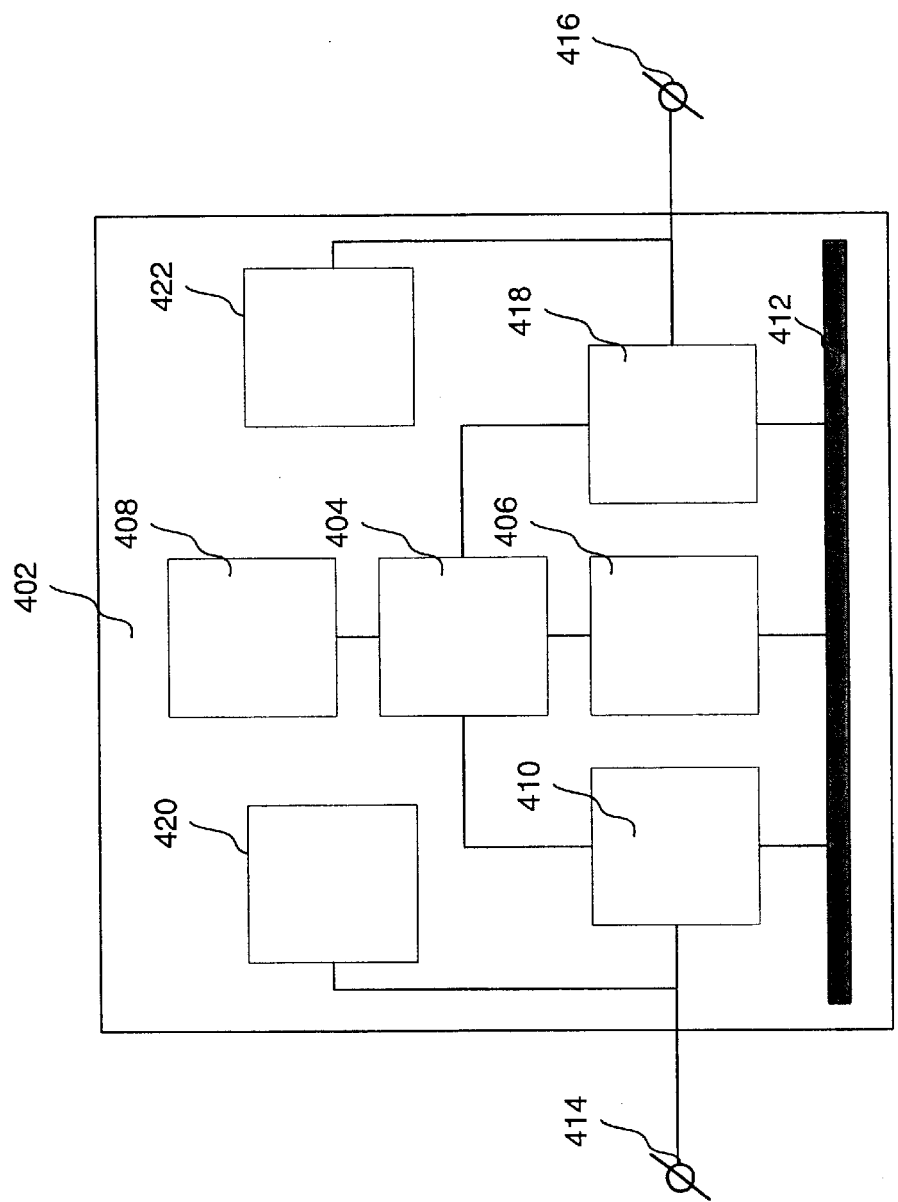

These and other aspects of the invention will become apparent from and will be elucidated with reference with respect to the implementations and embodiments described hereinafter and with reference to the accompanying drawing, wherein:

FIG. 1 schematically shows the main modules of the memory address translation unit and the main components to which the memory address translation unit is connected;

FIG. 2A schematically shows the mapping of 64×1 pixels onto memory device data-units;

FIG. 2B schematically shows the mapping of 16×4 pixels onto memory device data-units;

FIG. 3 schematically shows a mapping of interlaced video onto memory device data-units; and FIG. 4 shows the most important elements of an image processing apparatus according to the invention.

FIG. 1 schematically shows the main modules of the memory address translation unit 102 and the main components to which the memory address translation unit is connected. The processor 116 requests for data accesses. The data is stored in the memory device 118. Each request for data access by the processor results in a data transfer 124 from the processor to the memory device or vice versa. The processor provides the logical address 120 of each data element 128 of each data-block 126, to the memory address translation unit, with each request for data access. The memory address translation unit translates this logical addresses 120 to a physical addresses 122. The memory address translation unit provides the physical address to the memory device. The memory device 118 contains a number of data-units 130. Each data-unit contains a number of data-cells 132. The memory device comprises 4 banks 136.

The memory address translation unit comprises the following components:

A data-block analyzer 104. The data-block analyzer is designed to determine values of properties of each data-block that is stored or retrieved. The properties of a data-block are for example the vertical size and the horizontal size, the physical address of the first data cell corresponding to the first data element of the data-block. The data-block analyzer is designed for checking the type of video, i.e. interlaced or progressive. Based on collected values of properties of the data-blocks that have been stored or retrieved during a predetermined period of time the data-block analyzer 104 can derive values of the probabilities of occurrence of certain data requests; the probability that a data-block with certain dimensions is accessed or the probability distribution of the physical addresses of each first data element of each data-block.

A memory transfer overhead calculator 106. The memory transfer overhead calculator is designed to calculate the memory transfer overhead for a set of control parameters. The information that is gathered by the data-block analyzer 104, is input for the memory transfer overhead calculator is 106. Besides that information, properties of the memory device must be known, e.g. the width of the memory bus and the number of banks 136. These properties are constants. The organization into memory banks, i.e. a strategy to spread the data-blocks over the various banks 136, is an important element for memory bandwidth efficiency. This strategy must be provided to the memory transfer overhead calculator.

A minimum cost establisher 108. The minimum cost establisher provides the memory transfer overhead calculator 106 with various sets of control parameters. The minimum cost establisher is arranged to determine which set of control parameters results in the lowest possible memory transfer overhead. Output from the minimum cost establisher comprises the optimum window size. Another task of the minimum cost establisher is to verify whether another mapping would have resulted in a lower memory transfer overhead, if the mapping had been used during a predetermined period of time instead of the current mapping, for the data-blocks stored in respectively retrieved from the memory device. The minimum cost establisher 108 notifies the mapping generator 110, if the minimum cost establisher detects that the current mapping is not the most optimal mapping.

A mapping generator 110. The mapping generator is arranged to generate the mapping to translate a logical address of a data element of a data-block to a physical address of a data cell of a data-unit. To generate this mapping the mapping generator 110 requires information that is calculated by the minimum cost establisher 108. The mapping generator is subscribed on events, e.g. better mapping found, generated by the minimum cost establisher. The output from the mapping generator is a look up table 134. This look up table 134 describes the mapping.

An address generator 112. The address generator determines for each instance of a logical address the physical address. It uses the look up table 134.

A memory command generator 114. To access a data-unit in the memory device, e.g. SDRAM, first a row-activate command also called Row Address Strobe (RAS) has to be issued for a bank 136 to copy the addressed row into the page of that bank. After some delay, a read or write command also called Column Address Strobe (CAS) for the same bank can be issued to access the required data-units in the row. When all required data-units in the row are accessed, the corresponding bank can be pre-charged. The timing of all these commands is critical. The memory command generator, creates these commands for each data access, in the right order and with the right delay in between the commands.

FIG. 2A schematically shows the mapping of 64×1 pixels onto memory device data-units and FIG. 2B schematically shows the mapping of 16×4 pixels onto memory device data-units. It is assumed that one pixel corresponds with one byte. The memory device 201 comprises 64 data-units. Each data-unit can contain 64 bytes. The logical size of the memory device is such that it can keep the pixels from 32 video lines with 128 pixels each. The memory device contains 4 banks. The data-units corresponding to the various banks are indicated with references 202-208. For the mapping of pixels, several options can be recognized. The most straight forward way is to map 64 successive pixels of a video line onto one data-unit as depicted in FIG. 2A. FIG. 2A shows how each consecutive row of 64 pixels is interleaved in the banks in both horizontal and vertical direction. Due to the interleaved mapping, the accesses to the memory nicely address the four banks successively if the pixel data is sequentially read or written. However, when a data-block of 16×16 pixels is requested from the memory device, the amount of data that is transferred is much more. If the data-block is horizontally positioned within one data-unit, 64×16 pixels are transferred. If the data-block overlays two data-units in horizontal direction, the amount of transferred data is 128×16 pixels. When a mapping strategy is chosen as depicted in FIG. 2B, the overhead is less. However, when a data-block of 128×1 is requested, FIG. 2A provides a better mapping strategy.

FIG. 3 schematically shows a mapping of interlaced video onto memory data-units. It is assumed that one pixel corresponds with one byte. The memory device 301 comprises 64 data-units. Each data-unit can contain 64 bytes. The logical size of the memory device is such that it can keep the pixels from 32 video lines with 128 pixels each. The memory device contains 4 banks. The data-units corresponding to the various banks are indicated with references 302-308. For several applications in a multi-media system, it is necessary to read the video data both progressively and interlaced, e.g. frame prediction and field prediction for MPEG decoding. However, when subsequent odd and even lines are mapped onto the same data-unit, it is not possible to access only odd or even lines without wasting memory bandwidth. Therefore, the odd and even lines are positioned in different banks of the memory device. As a result, the data-units are interleaved in the memory device when the vertical size of the data-blocks is larger than 1. The resulting mapping strategy for data-units of 16×4 pixels is shown in FIG. 3. For efficient access of interlaced video data, the mapping of odd and even video lines onto odd and even banks is toggled after four units in vertical direction. Thus the first odd lines are mapped onto bank 0 and 2 while the even lines are mapped onto bank 1 and 3. In the successive video lines it is done the opposite way; the odd lines are mapped onto bank 1 and 3 and the even lines are mapped onto bank 0 and 2. For progressive video this does not make a difference, but for interlaced video however, this results in addressing of all banks instead of only the odd or only the even banks. Note that for retrieval of data-blocks of 16×4 pixels with progressive video lines the size has become eight lines in vertical direction, whereas for access to data-blocks with interlaced video the size is four lines.

FIG. 4 shows the most important elements of an image processing apparatus according to the invention. The image processing apparatus 402 has a processing means 406 for processing data representing images to be compressed, de-compressed, enhanced or filtered. This data may be broadcasted and received via an antenna or cable but may also be data from a storage device like a VCR (Video Cassette Recorder) or DVD (Digital Versatile Disk). The interface unit for importing data 410 has a connector 414. The interface unit for importing data is connected to a bus 412 for data transfer inside the image processing apparatus 402. The data can be sent out via a cable but may also be stored my means of a device like a VCR or CD- Recorder (Compact Disk Recorder). The interface unit for exporting data 418 has a connector 416. The interface unit for exporting data is connected to the bus 412 for data transfer inside the image processing apparatus 402. The data may also be generated by the image processing apparatus by means of an image capture unit 420. The data may also be visualized by the image processing apparatus by means of an image display unit 422. The data can be stored in the memory device 408. Access to data to be stored or retrieved in respectively from the memory device is handled by the memory address translation unit 404. The interface unit for receiving data 410, the interface unit for exporting data 418 and the processing means 406 communicate with the memory address translation unit 404 in order to access data.

In FIG. 2A, FIG. 2B and FIG. 3 examples are provided of mappings. To find an optimal mapping any minimization method can be used to determine M the horizontal size of the window and N the vertical size of the window such that the following condition is satisfied:

$$\min_{M,N \in (\aleph^+) \wedge M \cdot N = S} (\overline{o}(M, N, V)), \quad (1)$$

where S is the size of the window given in amount of pixels, $\aleph^+ = \{1, 2, 3, 4, 5, \ldots\}$ and $$\overline{o}(M, N, V) = \overline{o}_i(M, N, V_i) + \overline{o}_p(M, N, V_p) \quad (2)$$

with $V = V_i \cap V_p$.

$\overline{o}_i(M, N, V_i)$ and $\overline{o}_p(M, N, V_p)$ represent the overhead for respectively interlaced data-block requests and progressive data-block requests. When a set of data-blocks, consisting of both interlaced and progressive video, has to be considered, the set has to be separated and Equation 3 respectively Equation 4 have to be applied to the subsets.

The overhead for interlaced data-block requests can be calculated as follows:

$$\overline{o}_i(M, N, V_i) = \left( \frac{\sum_{B_x \times B_y \in V_i} P(B_x \times B_y) \sum_{m=0}^{M-1} \sum_{n=0}^{N-1} \left( P_{B_x \times B_y}(M, N) \cdot hsize(B_x) \cdot vsize_i(B_y) \right)}{\sum_{B_x \times B_y \in V_i} P(B_x \times B_y) \cdot B_x \cdot B_y} \right) \cdot 100\%, \quad (3)$$

with, $$hsize(B_x) = 1 + \left\lfloor \frac{B_x + m - 1}{M} \right\rfloor, \text{ and}$$

$$vsize_i(B_y) = 1 + \left\lfloor \frac{B_y + n - 1}{N} \right\rfloor$$

Where $V_i$ is the set of possible data-blocks $B_x \times B_y$ and $P(B_x \times B_y)$ the probability of the data-block. And where $P_{B_x \times B_y}(M, N)$ is equal to the probability that the upper left corner pixel, i.e. the first element of a data-block, of a requested data-block $B_x \times B_y$ is positioned at any location (x, y) that satisfies the following condition: x mod M=m AND y mod N=n. The numerator in equation 3 represents the amount of transferred data including overhead. The denominator represents the amount of requested data without the overhead. The overhead for progressive data-block requests can be calculated as follows:

$$\overline{o}_p(M, N, V_p) = \left( \frac{\sum_{B_x \times B_y \in V_p} P(B_x \times B_y) \sum_{m=0}^{M-1} \sum_{n=0}^{2N-1} \left( P_{B_x \times B_y}(M, N) \cdot hsize(B_x) \cdot vsize_p(B_y) \right)}{\sum_{B_x \times B_y \in V_p} P(B_x \times B_y) \cdot B_x \cdot B_y} \right) \cdot 100\%, \quad (4)$$

with, $$hsize(B_x) = 1 + \left\lfloor \frac{B_x + m - 1}{M} \right\rfloor \text{ and } vsize_p(B_y) = \left( 1 + \left\lfloor \frac{\left\lfloor \frac{B_y}{2} \right\rfloor + \left\lfloor \frac{n}{2} \right\rfloor - 1}{N} \right\rfloor \right) + \left( 1 + \left\lfloor \frac{\left\lfloor \frac{B_y}{2} \right\rfloor + \left\lceil \frac{n}{2} \right\rceil - 1}{N} \right\rfloor \right)$$

The numerator in equation 4 represents the amount of transferred data including overhead. The denominator represents the amount of requested data without the overhead. For this optimization method, the data-blocks with $B_y=1$ are considered as interlaced requests and therefore, they are contained in set $V_i$.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps other than those listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

What is claimed is:

1. A memory address translation device, comprising:
   a memory bus interface for issuing access requests to a number of banks of memory addressable by their physical memory addresses;
   a processor bus interface for receiving logical memory address access requests for translation into physical memory address access requests;
   a lookup table for implementing a mapping of translations of data element logical addresses to data cell physical address, and having its input connected to the processor bus interface and its output connected to the memory bus interface;
   a data-block analyzer for characterizing the size, location, and type of data stored in blocks in said banks of memory;
   a memory transfer overhead calculator for computing a memory transfer overhead cost from information gathered by the data-block analyzer, given a set of control parameters, a memory bus width, and an organization and a number of banks of memory that are accessible to the memory bus interface,
   a minimum cost estimator for providing the memory transfer overhead calculator with control parameter sets, and for comparing alternative memory transfer overhead costs and determining a lowest cost choice, and connected to notify the mapping generator if a current mapping is determined not to be the most optimal mapping;
   a mapping generator connected to receive calculations from the minimum cost estimator, and for translating an input logical memory address to an output physical memory address, and connected to output data to the lookup table; and
   an address generator connected to the lockup table and for determining each instance of a logical memory address and its corresponding physical memory address.

2. The memory address translation device of claim 1, wherein:
   the memory bus interface is such that said number of banks of memory provide storage for interleaved blocks of pixels of digital video data with block sizes that depend on said computing a memory transfer overhead cost by the memory transfer overhead calculator.

3. The memory address translation device of claim 1, wherein:

the data-block analyzer is such that the lookup table maps odd and even lines of pixels of digital video data into different banks of physical memory.

4. The memory address translation device of claim 1, further comprising:

a memory command generator for generating row address and column address strobe commands to said banks of memory according to critical timing required between commands.

* * * * *